United States Patent Office 2,917,542
Patented Dec. 15, 1959

2,917,542

MANUFACTURE OF MONOCHLOROACETIC ACID

James Irwin Jordan, Jr., Wichita, Kans., assignor to Frontier Chemical Company, Division of Vulcan Materials Company, Wichita, Kans., a corporation of New Jersey No Drawing. Application March 25, 1958
Serial No. 723,644

6 Claims. (Cl. 260—539)

This invention relates to an improvement in the process for manufacturing monochloroacetic acid by the chlorination of acetic acid in admixture with acetic anhydride using molybdenum pentachloride as the catalyst.

It has been known that acetic anhydride, when mixed with acetic acid, promotes the chlorination of acetic acid to monochloroacetic acid. I have now found that the reaction may be substantially improved by the use of a novel catalyst, namely, molybdenum pentachloride. The use of this catalyst decreases the chlorination time and increases the yield of monochloroacetic acid based upon (A), the acetic acid in the charge and (B), upon the chlorine used.

In accordance with the invention, a mixture of acetic acid and at least 12.5% of acetic anhydride is subjected to chlorination with gaseous chlorine at a temperature in the range of about 175° to about 210° F. in the presence of about 0.1% to 10% molybdenum pentachloride.

The reaction may be carried out in any suitable type of equipment which provides means for removal of the by-product hydrogen chloride formed during reaction, and which provides means for maintaining acetic acid and the anhydride or the reaction products thereof with chlorine, in the system during the period of time necessary to effect chlorination. One suitable apparatus comprises a reaction kettle which is fitted with a water cooled condenser and a lower temperature condenser which may be cooled by refrigerated brine to a temperature adequate to condense the liquid products and return them by reflux or otherwise to the reaction zone. This prevents loss of the acetic acid and acetic anhydride.

The reaction was carried out under laboratory conditions using a double reflux condenser, the first of which was cooled with water at about 70° F. and the second cooled with Dry Ice. The reaction was carried out at a temperature of about 190° F. to about 200° F., the acetic anhydride being mixed with glacial acetic acid in the proportions indicated in the following Table I. All percentage values given herein are by weight unless otherwise indicated.

*Table I.—Laboratory runs*

| Percent Acetic Anhydride | Percent MoCl₅ | Time, Hours | Yield, percent MCA—Basis Acetic Acid |
|---|---|---|---|
| 12.5 | 0.0 | 15.0 | 85.0 |
| 25.0 | 0.0 | 11.0 | 78.5 |
| 25.0 | 0.0 | 12.5 | 78.0 |
| 25.0 | 0.1 | 10.0 | 75.0 |
| 25.0 | 0.1 | 11.0 | 82.9 |
| 25.0 | 0.2 | 11.0 | 89.6 |
| 25.0 | 0.2 | 12.5 | 92.0 |

Where catalyst was used it was added to the liquid which was then brought to the chlorinating temperature. Chlorine was injected through diffusion tubes at a rate of about 145 to 160 parts per hour per approximately 2600 parts of reaction mixture, until the specific gravity of the mixture reached about 1.280. The catalyst was employed in proportions of about 0.1% and about 0.2% by weight of the total mixture of acetic acid and acetic anhydride. Chlorination times of about 10 to about 15 hours were employed in the laboratory.

The data in Table I show that the addition of about 0.1% of catalyst improves the yield in an 11 hour chlorination time by about 4.4% over that which can be obtained in a corresponding period of time in the absence of catalyst. It also shows that in a comparable chlorination time, the use of 0.2% of molybdenum chloride catalyst increases the yield by a little more than 11% based upon the acetic acid undergoing reaction. When the chlorination time was increased to 12.5 hours with 0.2% catalyst, the increase in yield is about 14% over what can be obtained in the absence of catalysts for a comparable chlorinating period. There should be at least 12.5% of acetic anhydride in the reaction mixture. Preferably there should be about 20% to 30% of acetic anhydride in the mixture with best results being obtained at approximately 25% of acetic anhydride.

In Table II are shown a series of runs carried out on a plant scale. The chlorination time was somewhat longer than in the laboratory because contacting was not as efficient on the larger scale as in the laboratory tests.

*Table II.—Plant runs*

| Percent Acetic Anhydride | Percent MoCl₅ | Time, Hours | Yield, Percent MCA | |
|---|---|---|---|---|
| | | | Basis Acetic Acid | Basis Chlorine |
| 24 | 0 | 21.8 | 73.9 | 53.3 |
| 25 | 0 | 28.0 | 81.5 | 56.5 |
| 24 | 0.27 | 20.3 | 83.5 | 64.8 |
| 24 | 0.27 | 17.0 | 76.0 | 71.0 |
| 25 | 2.5 (PCl₃) | 18.0 | 65.8 | 66.8 |
| 25 | 2.0 (PCl₃) | 19.0 | 57.0 | 57.0 |
| 25 | 2.0 (PCl₃) | 22.0 | 67.1 | 58.3 |

The runs were made using a 650 gallon glass lined vessel charged with about 300 gallons of the glacial acetic acid-anhydride mixture. The results were compared with a series of runs in which phosphorous trichloride was used as the catalyst. Phosphorous trichloride has been heretofore suggested as a catalyst for the reaction in the proportions used in these runs. The yields are reported on the basis of the percent by weight of the acetic acid and also on the basis of the chlorine used.

The data in Table II establish that the use of about 0.27% molybdenum pentachloride improves the yield both on the basis of the acetic acid and of the chlorine used by a substantial amount over that which can be obtained either with no catalyst present, or with approximately 10 times as much phosphorous trichloride catalyst. Thus, at a reaction time of about 22 hours, the yield of monochloroacetic acid based on the acetic acid was approximately 10% less when no catalyst was used than when using 0.27% of molybdenum pentachloride and a reaction time shorter by approximately 1½ hours. A similar effect is observed with respect to the yield based on the chlorine.

When using a 17 hour chlorination time with molybdenum pentachloride, the yield was about 4% better, based upon the acetic acid than could be obtained in approximately 22 hours without catalyst. Based upon the chlorine used the yield was increased by about 7.7%. The chlorination period was reduced by almost five hours.

It was found that phosphorous trichloride in an amount of about 2.0-2.5% by weight of the reaction mixture improves the yield based on chlorine consumed to some extent but the yield based on the acetic acid was lower than when no catalyst was used, even when using a chlorination time of about 22 hours. Possibly the chlorination time of 18–22 hours was insufficient when employing the phosphorous trichloride catalyst. In any event, the results were far inferior, both as to time and yields, to those obtained when using approximately one-tenth as much of the molybdenum pentachloride catalyst of this invention.

It is evident therefore that the use of my novel catalyst results in the decrease in chlorination time and results in an increase in chlorination efficiency as shown by the improvements in the yield of monochloroacetic acid from the acetic acid charge as well as from the chlorine charge.

The molybdenum pentachloride may be used in amounts from about 0.1% to about 10%, although there appears to be little advantage in using proportions of catalyst above about 0.2 to about 1.0% by weight of the original reaction mixture. Although an acetic anhydride content of 50% by weight and higher can be used, my experiments have indicated that there is little advantage to be derived from increasing the acetic anhydride content substantially beyond 25%. The preferred range for operation is about 15–30% and preferably about 20–25% by weight of anhydride.

The acetic acid and anhydride which have not undergone reaction are recovered by distillation and may be used in succeeding batches. The hydrogen chloride which is evolved is drawn off continuously and may be absorbed in water and recovered as aqueous hydrochloric acid by methods known to the art.

The removal of the molybdenum catalyst from the crude monochloroacetic acid reaction product is not necessary when the latter is to be used in organic synthesis such as reaction of the monochloroacetic acid and 2,4-dichlorophenol to produce 2,4-dichlorophenoxy acetic acid (2,4D).

If desired the catalyst can be removed and monochloroacetic acid can be separated from the remaining reaction products such as the dichloroacetic acid by methods known to the art, where the presence of the latter may be objectionable. The proportions of dichloroacetic acid usually amount to about 2–5% of the reaction product.

Other chlorides of molybdenum may be used, although the pentachloride is the only one commercially available. It is probable that the chlorides would be converted to the pentachloride under the reaction conditions so that the pentachloride becomes the ultimate catalyst in any event.

The conditions described are by way of illustration and should not be construed as limiting the invention to the exact procedural steps used.

I claim as my invention:

1. A process for monochlorinating acetic acid which comprises subjecting a mixture of glacial acetic acid and at least about 12.5% of acetic anhydride to catalytic chlorination at an elevated temperature in the range of about 175° to about 210° F. in the presence of chlorine gas and a minor catalytic proportion of molybdenum pentachloride as the chlorination catalyst, and recovering monochloroacetic acid as the principal product of the reaction.

2. The process of claim 1 wherein the temperature is in the range of about 175° F. to about 210° F.

3. The process of claim 1 wherein the catalyst is employed in an amount of about 0.1% to about 10% by weight of the initial reaction mixture.

4. The process of claim 1 wherein the catalyst is employed in an amount of 0.1% to about 2.5% by weight of the reaction mixture.

5. The process of claim 1 wherein the acetic anhydride is present in an amount of about 15% to about 30% by weight of the reaction mixture.

6. In a procedure for monochlorinating acetic acid by contacting an initial reaction mixture containing a glacial acetic acid with elemental chlorine at an elevated temperature in the range of about 175° to about 210° F. and recovering the reaction mixture containing monochloroacetic acid as the principal product of the process, the improvement which comprises effecting said monochlorination in the presence of about 0.1% to about 10% of molybdenum pentachloride as the catalyst for the reaction, said percentages being by weight of the initial reaction mixture.

References Cited in the file of this patent

UNITED STATES PATENTS

| 2,429,985 | Blume et al. | Nov. 4, 1947 |
| 2,503,334 | Hammond et al. | Apr. 11, 1950 |

FOREIGN PATENTS

| 682,282 | Great Britain | Nov. 5, 1952 |
| 316,151 | Switzerland | Nov. 15, 1956 |

OTHER REFERENCES

Aronheim: Ber. Deut. Chem. 8, 1400–1 (1875).
Schleede et al.: Ber. Deut. Chem. 55, 3710–3725 (1922).
Berkman et al.: Catalysis, p. 590 (1940).
Lee: Chem. Eng., 54, No. 11, 188–120 (1947).